United States Patent [19]
Armington et al.

[11] 3,901,723
[45] Aug. 26, 1975

[54] LASER WINDOW MATERIALS

[75] Inventors: Alton F. Armington, Lexington; Harold Posen, Brookline, both of Mass.

[73] Assignee: The United States of America as represented by the Secretary of the Air Force, Washington, D.C.

[22] Filed: Jan. 24, 1973

[21] Appl. No.: 326,207

[52] U.S. Cl. .............................. 106/286; 252/300
[51] Int. Cl.² ........................................... C09K 3/00
[58] Field of Search ...................... 106/286; 423/499

[56] References Cited
OTHER PUBLICATIONS
International Critical Tables of Numerical Data, Physics, Chemistry & Technology, Vol. VI, 1929, p. 155.
Int. Critical Tables of Numerical Data et al., Vol. III, p. 135, 1928.
Chem. Abst., Vol. 70, 1969, 70:109,737s.

*Primary Examiner*—Theodore Morris
*Attorney, Agent, or Firm*—Joseph E. Rusz; William J. O'Brien

[57] ABSTRACT

A high power infrared laser window material composed of a binary alkali halide single crystal body. The mixed crystal exhibits a uniform stoichiometric compositional content of from about 66 to 68 mol percent potassium bromide and from about 34 to 32 mol percent potassium chloride.

2 Claims, 2 Drawing Figures

LASER WINDOW MATERIALS

BACKGROUND OF THE INVENTION

This invention relates to laser window materials and to a method for their preparation. More particularly, this invention concerns itself with binary alkali halide single crystals and to a method for their preparation. It also concerns itself with the use of these crystals as structural materials in the fabrication of laser windows.

Recent advances in the field of laser technology, especially in the area of high energy gas lasers, have created a need for the development of laser window materials capable of handling large amounts of laser energy. For example, the problem of producing infrared window materials for use at 10.6 um, the lasing wavelength of the $CO_2$ gas laser, as well as at 3 to 5 um, the lasing wavelength for HF, DF and other chemical laser involves a number of difficulties.

As is well known, a laser window is a passive device which functions as a physical barrier between the laser apparatus and the outside environment in order to prevent the escape of gaseous material from the laser. It must also transmit the laser energy essentially in an unaffected form. Therefore, the laser window material, especially for military application, must possess a combination of structural and optical integrity of the highest order. For military operations, the windows have to be designed to withstand excessive mechanical distortion, owing to environmental factors and laser energy absorption. Structural integrity implies mechanical rigidity, which immediately precludes the use of gases and liquids as window materials. Thus, attention is properly limited to amorphous or ordered solids. Structural integrity also stipulates a reasonable degree of durability and survivability. Thus, solids which lack hardness, chemical inertness, sufficiently high melting points and mechanical strength, must also be excluded from the list of potential solid materials. In addition, the window material must be capable of passing an extremely high powered laser beam without creating damage to the window itself.

At the present time, alkali halide crystals are the most desirable material for window use. However, the alkali halides do not possess the requisite strength needed to withstand the shock and vibrations encountered during military and flight operations. Their use as an infrared laser window material, therefore, is severely limited.

Previous attempts at improving the strength of the alkali halide, such as through the use of conventional alloying techniques, have not proved fruitful. Although the allow materials possess increased strength, their optical and thermal properties where not satisfactory. Thus, they lacked the necessary combinaof structural and optical integrity.

In attempting to overcome the problems associated with previously known window materials, it has been found that certain specific combinations of mixed halides can physically strengthen the alkali halide crystals without deteriorating their optical or thermal characteristics. Because of the strengthening affect achieved by this invention, laser windows made from the single crystalline materials disclosed herein can be utilized under more adverse operating conditions than the conventional halide window materials.

The single crystalline materials of this invention are mixtures of potassium chloride and potassium bromide that exhibit a phase diagram temperature minimum that produces a uniform composition. Specifically, the compositional concentration that produces uniformity is within the range of about 66 mol percent to 68 mol percent potassium bromide with the balance essentially potassium chloride.

SUMMARY OF THE INVENTION

In accordance with the broad concept of this invention binary alkali halide single crystals are produced by a process which provides for compositional uniformity. The single crystals are mixtures of potassium chloride and potassium bromide that exhibit a stoichiometric uniformity in their compositional content throughout the crystalline material.

The particular halides are mutually soluble in all proportions. However, a problem existed in that the halide mixture lost its stoichiometry upon cooling, resulting in non-uniform concentrations that adversely affected the optical properties of the material. With this invention, the problem is eliminated by formulating mixtures whose proportions exhibit a phase diagram temperature minimum. Such mixtures exhibit a stoichiometric uniformity throughout the crystalline material. In accordance with this invention, the binary mixtures have specific concentrations ranging from 66 to 68 mol percent potassium bromide and 34 to 32 mol percent potassium chloride.

Accordingly, the primary object of this invention is the production of a single crystalline material suitable for use as an infrared laser window material in the 3 to 5 um and 10.6 um laser wavelength range of gas lasers.

Another object of this invention is the utilization of a phase diagram minimum to produce stoichiometric uniformity in a binary alkali halide single crystalline material.

Still another object of this invention is to provide a method for strengthening alkali halide single crystalline materials without adversely affecting their optical properties.

A further object of this invention is to provide for the development of laser window materials that are not subject to mechanical failure when used as infrared laser windows within an operational environment where vibration and shock can cause such a failure.

Still a further object of this invention is to provide mixed halide single crystalline materials that exhibit a uniform stoichiometric composition throughout their crystaline structure.

The above and still further objects, advantages and features of the present invention will become readily apparent upon consideration of the following detailed description thereof when taken in conjunction with the accompanying drawing.

DESCRIPTION OF THE PREFERRED EMBODIMENTS

Figure 1:
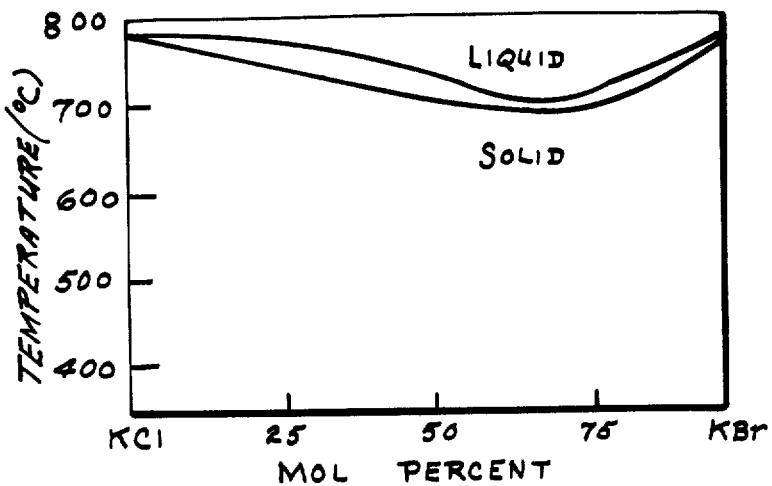
FIG. 1 is a graphical illustration showing a phase diagram for the mixed halide single crystals of this invention.

The present invention encompasses a technique for preparing mixed alkali halide single crystals for use as laser window materials. Structural materials for use as laser windows must possess satisfactory mechanical, thermal and optical properties, and must be amenable to preparation and processing to an extended size. The alkali halides known heretofore possess many of the characteristics required by laser windows. However, they lack the necessary combination of mechanical strength and optical integrity required by high energy gas lasers for military applications. For example, there is an urgent need for infrared windows capable of operating at the 10.6 u wavelength range for use in laser weaponry. At present, there is no material available that can transmit this radiation without absorbing harmful amounts of the laser light. This causes heating of the window material with the result that the window will mechanically fail, or, more likely, since more heat is absorbed at the center of the window, the excess heat will cause more thermal expansion in the center, causing the window to act as a lens and distorting the beam as it passes through the window. (thermal lensing).

The best family of materials presently available are alkali halides such as KCl and HBr. However, these materials are mechanically weak which means that very thick windows must be produced to withstand the mechanical strain of an aircraft. Even thick windows however, are not reliable due to mechanical flaws.

The present invention describes an alkali halide mixture that is significantly stronger than pure halides which can result in a window superior to those presently available.

In order to carry out the practice of this invention, two well known methods of achieving crystal growth were utilized. The first method is the well known Czochralski Technique. In this method, a container with about 80 grams of a mixture comprising 67 mol percent KBr and 33 mol percent KCl is melted by heating above the melting point of about 760°C, as indicated in the phase diagram of FIG. 1. A seed of the solid solution is then dipped on the top surface of the melt, and then slowly retracted at a rate of 1–2 cm/hour. Part of the melt is drawn to the bottom of the seed during retraction, solidifying as a crystal as it cools. The thickness of the seed can be varied by changing the temperature of the melt.

The second method involved in carrying out this invention is the well known Bridgman method. In this method, a charge containing 67 mol percent KBr and 33 mol percent KCl, of about 200 gm is used. This is held in a graphite container encapsulated in quartz. The entire charge is melted in the hot zone of a two zone furnace. One zone, where the material is first melted, is held at 750° while the second furnace, located just below the hot furnace, is held below the melting point of the solution. In this technique the second furnace was held at 680°–690°C.

The molten charge is then lowered from the hot furnace to the cooler furnace slowly at a programmed rate of from one to two days. The charge freezes slowly as it reaches the second furnace into crystalline form. A constriction is often added at the bottom (first freezing section) of the crucible which helps to form a good seed which in turn aids in the formation of a single crystal charge. The Czochralski method has been performed in air, inert gas, and a hydrogen chloride atmosphere. The Bridgman method was performed in vacuum.

Figure 2:
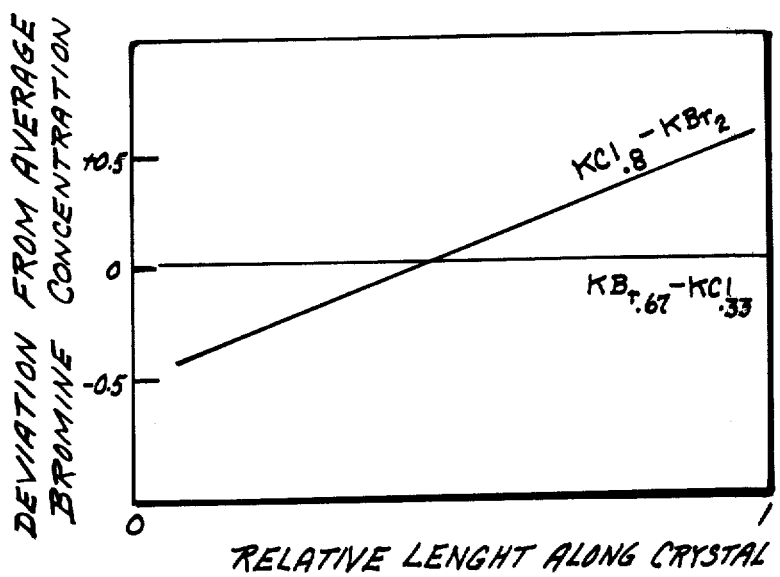
FIG. 2 is a graphical illustration showing the variation of bromine content along crystal length for the crystals of this invention.

In order to grow the mixed solution of this invention without producing a non-uniform stoichiometry, it is necessary to grow at the minimum of a phase diagram as shown in FIG. 1. In addition, the area below the solidus at the minimum must contain a solid solution. If any point except a minimum is used, the solid freezing out will have a different composition than the liquid. This variation is shown in FIG. 2 by connecting to solidus and liquidus with a horizontal line representing a uniform temperature, the situation that exists during crystal growth. Since the composition of the solid is not the same as the liquid, this will cause the concentration in the liquid to vary. Also, since the liquid composition is changing, this causes the melting point to vary, resulting in a solid of varying composition in the final crystal. However, when one grows a crystal at a minimum, the solidus and liquidus coincide with the result that the solid and liquid have the same composition. Thus, a uniform stoichiometry can be produced in the final crystal.

A solid solution (no lines in the solid region) in the solid region is necessary to prevent formation of inhomogeneous phases after solidification. A homogeneous solution is necessary in order to prevent changes of the refractive index within the crystal. This will cause light scattering which will distort the beam as it passes through the material.

The specific practice of the invention is further illustrated by the fact that crystals were grown from mixtures of potassium chloride and potassium bromide at concentrations varying from 10 to 75 mol percent potassium bromide. Mechanical and optical measurements were made on the resulting crystals. The crystal growth method used were the Czochralski method referred to above, which embodies withdrawing a seed from the melt and the Bridgman technique, also described above, which involves careful slow cooling of the melt. The emphasis of this invention was placed on the growth of crystal compositions represented by the minimum of the phase diagram as shown in FIG. 1. Namely, those containing 66–68 mol percent potassium bromide (KBr). In this area of the diagram, the top line (liquid concentration) and the bottom line (solid concentration) coincide. Thus, there is no change in concentration as the solid is removed from the liquid area of the same concentration. At areas away from this minimum, the solid and liquid are of different concentration, as indicated by the spacing between the top and bottom lines. Thus, in these instances, the solid removed is a different concentration than the remaining liquid which causes the liquid to have a continuing change in concentration. This causes the solid to also be continually changing in composition since the solid and liquid are in equilibrium.

As an example, FIG. 2 shows the variation of bromine (from KBr) in the vicinity of the minimum and at a concentration not in the vicinity. It can be seen that the concentration of the 20 mol percent potassium bromide crystal varies monotonically along the length while there is no noticeable variation in the 67 mol percent sample.

The Knoop hardness of the 67 mol percent KBr is 21 versus 8.3 for pure KCl and 6.8 for pure KBr. The fracture strength is over 1,300 (psi) while pure KCl is about 700 (psi) and the KBr is below 700. The Knoop hardness of the 25 mol percent alloy was 16.

Optical absorption of the 67 mol percent sample was 0.0036 per cm which is about the same as for pure KCl (0.0038). At the 25 mol percent, the optical absorption was 0.01 per cm indicating a degradation of the optical absorption when measured at a wavelength of 10.6 um.

Laser windows of this material may be fabricated using the same conventional techniques as used for pure alkali halides. Thus, the strengthening can be accomplished with a minimum of effort.

The strengthening of the crystalline material is produced through solid solution hardening which involves melting and cooling of two halides which are mutually soluble. In this invention, mixtures of potassium chloride and potassium bromide are used. The materials are mutually soluble in all proportions. However, most solid solutions lose their stoichiometry on cooling, thus producing a non-uniform concentration in the ingot. These non-uniformities can adversely affect the optical properties of the material. By working at an area of the phase diagram showing a temperature minimum, this problem can be eliminated.

To be more specific, the compositional concentrations for the crystalline materials of this invention that exhibit the necessary stoichiometric uniformity are (1) 66 mol percent potassium bromide −34 mol percent potassium chloride; (2) 67 mol percent potassium bromide −33 percent potassium chloride; and (3) 68 percent potassium bromide and 32 percent potassium chloride.

The composition of the crystals, when analyzed by electron micro-probe, does not change along the length of the ingot in the region where minimum in the liquidus and solidus occurs. Analysis of crystals grown at other concentrations, however, do show variations as noted in FIG. 2. Hardness measurements, as shown in Table I, indicate that the hardness is approximately doubled when solid solutions exist.

Table I Solid Solutions and Hardness

| Sample No. | Description | Knoop Hardness |
|---|---|---|
| 1 | KCl | 9. |
| 2 | KBr | 8.3 |
| 3 | $KBr_{.25}-KCl_{.75}$ | 19.7 |
| 4 | $KBr_{.67}-KCl_{.33}$ | 21.0 |

A comparison was made between Bridgman grown crystals and Czochralski grown crystals as shown in Table II. The Bridgman crystals, grown in sealed, evacuated tubes, are about two hundred grams each compared to about fifty grams for the Czochralski. Both pure and mixed potassium chloride-bromide crystals were grown. The hardness of pure KCl is increased by the Czochralski method as shown in Table 2. This is probably due to the increased number of defects produced in the process. No change in hardness occurred for the mixed halide systems.

Table II Hardness of Bridgman and Czochralski Grown Crystals

| | Bridgman | Czochralski |
|---|---|---|
| KCl | 16.4 | 9.8 |
| $KCl_{.33}KBr_{.67}$ | 21 | 21 |

This invention in essence, describes certain combinations of mixed halides which exhibit a combination of physical strength and optical integrity. Because of this combination of characteristics, windows made of these materials can be used under more adverse conditions than windows made from pure halide without the ever present danger of mechanical failure.

While the invention has been described with particularity in reference to specific embodiments thereof, it is to be understood that the disclosure of the present invention is for the purpose of illustration only and is not intended to limit the invention in any way, the scope of which is defined by the appended claims:

What is claimed is:

1. A method for growing a solid ternary solution in single crystal form used as a laser window material which comprises the steps of providing a liquid solution of two mutually compatible materials which react to produce a mixed crystalline body in single crystal form; crystallizing said liquid solution such that the compositional content comprising a ternary alkali halide single crystal having a uniform stoichiometric compositional content of from about 66 to 68 mol percent potassium bromide with the balance substantially all potassium chloride and represents a liquidus-solidus minima in its phase diagram.

2. A method of using a material comprising a ternary alkali halide single crystal having a uniform stoichimetric compositional content of from about 66 to 68 mol percent potassium bromide with the balance substantially all potassium chrloride to prepare a laser window material.

* * * * *